Patented Nov. 19, 1935

2,021,680

UNITED STATES PATENT OFFICE 2,021,680

PREPARATION OF METHYLENE ETHERS

Tom Birchall and Samuel Coffey, Manchester, England, assignors to Imperial Chemical Industries Limited, Westminster, England No Drawing. Application July 29, 1930, Serial No. 471,591. In Great Britain August 30, 1929

6 Claims. (Cl. 260—151)

This invention relates to the manufacture of alkylidene ethers or acetals, including cyclic acetals, which have previously been obtainable only by expensive or inconvenient processes. In particular the invention relates to the production of methylene ethers.

We have found that hexamethylenetetramine reacts smoothly with alcohols in the presence of strong inorganic acids to give methylene ethers in good yield. For example hexamethylenetetramine is rapidly converted by methyl alcoholic hydrochloric acid, especially when gently warmed, into methylal and ammonium chloride according to the equation:

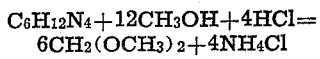
$$C_6H_{12}N_4 + 12CH_3OH + 4HCl = 6CH_2(OCH_3)_2 + 4NH_4Cl$$

The strong inorganic acid is preferably hydrochloric or sulphuric acid. It may be introduced into the reaction mixture either in the anhydrous form or as a concentrated aqueous solution. The alcohol used in accordance with our invention may be any aliphatic, alicyclic or aralkyl alcohol, saturated or unsaturated, and we include glycols and other polyhydric alcohols, e. g. methyl alcohol, n-butyl alcohol, amyl alcohol, benzyl and substituted benzyl alcohols, ethylene glycol, etc.

Our invention is illustrated but not limited by the following examples in which the parts are by weight.

Example 1

138 parts of ethyl alcohol and 35 parts of hexamethylene-tetramine are boiled under a reflux condenser, and 118 parts of hydrochloric acid of 36% strength are added gradually over 1 hour. The heat of reaction is sufficient to maintain the boiling temperature. On cooling the upper layer is separated, and treated with calcium chloride. It distils almost entirely at 88–90° C. and consists of methylene diethyl ether. (75 parts.)

Example 2

440 parts of n-butyl alcohol are stirred with 70 parts hexamethylene tetramine. Gaseous hydrochloric acid is passed in at such a rate that the temperature remains between 60 and 80° C., until 73 parts have been absorbed. After heating for 1 hour at 100° C. the product is extracted with water, then with dilute ammonia and distilled. The fraction boiling at 180–182° C. consists of methylene di-n-butyl ether. (380 parts.)

Example 3

46 parts of trimethylene glycol and 14 parts of hexamethylenetetramine are stirred together and 40 parts of hydrochloric acid of 36° Tw. are added. The temperature is allowed to rise and is maintained at 90 to 100° C. for one hour. The mixture is then distilled in steam. The distillate is dehydrated by adding fused caustic soda and the desired product, 1,3-dioxan, of boiling point 100–103° C. is purified by fractional distillation.

As many apparently widely different embodiments of this invention may be made without departing from the spirit thereof, it is to be understood that we do not limit ourselves to the foregoing examples or descriptions except as indicated in the following patent claims:

We claim:

1. The process of preparing methylene ethers which comprises interacting hexamethylenetetramine with an alcohol in the presence of an acid of the group consisting of sulphuric and hydrochloric acid in liquid phase, the acid being in quantity sufficient to decompose the hexamethylenetetramine.

2. The process of preparing methylene ethers which comprises interacting hexamethylenetetramine with an alcohol of the group consisting of saturated and unsaturated aliphatic, alicyclic and aralkyl alcohols in the presence of an acid of the group consisting of sulphuric and hydrochloric acid in liquid phase, the acid being in quantity sufficient to decompose the hexamethylenetetramine.

3. The process of preparing methylene ethers which comprises interacting hexamethylenetetramine with ethyl alcohol in the presence of an acid of the group consisting of sulphuric and hydrochloric acid in liquid phase, the acid being in quantity sufficient to decompose the hexamethylenetetramine.

4. The process of preparing methylene ethers which comprises interacting hexamethylenetetramine with n-butyl alcohol in the presence of an acid of the group consisting of sulphuric and hydrochloric acid in liquid phase, the acid being in quantity sufficient to decompose the hexamethylenetetramine.

5. The process of preparing methylene ethers which comprises interacting hexamethylenetetramine with a monohydric alcohol in the presence of an acid of the group consisting of sulphuric and hydrochloric acid in liquid phase, the acid being in quantity sufficient to decompose the hexamethylenetetramine.

6. The process of preparing methylene ethers which comprises interacting hexamethylenetetramine with a polyhydric alcohol in the presence of an acid of the group consisting of sulphuric and hydrochloric acid, the acid being in quantity sufficient to decompose the hexamethylenetetramine.

TOM BIRCHALL.
SAMUEL COFFEY.